Aug. 4, 1964     W. D. MARKOWSKI     3,143,024
ROTATABLE CUTTER TOOL PAIR WITH CUTTER DISC ANGULARLY POSITIONED
Filed Jan. 26, 1960     2 Sheets-Sheet 2
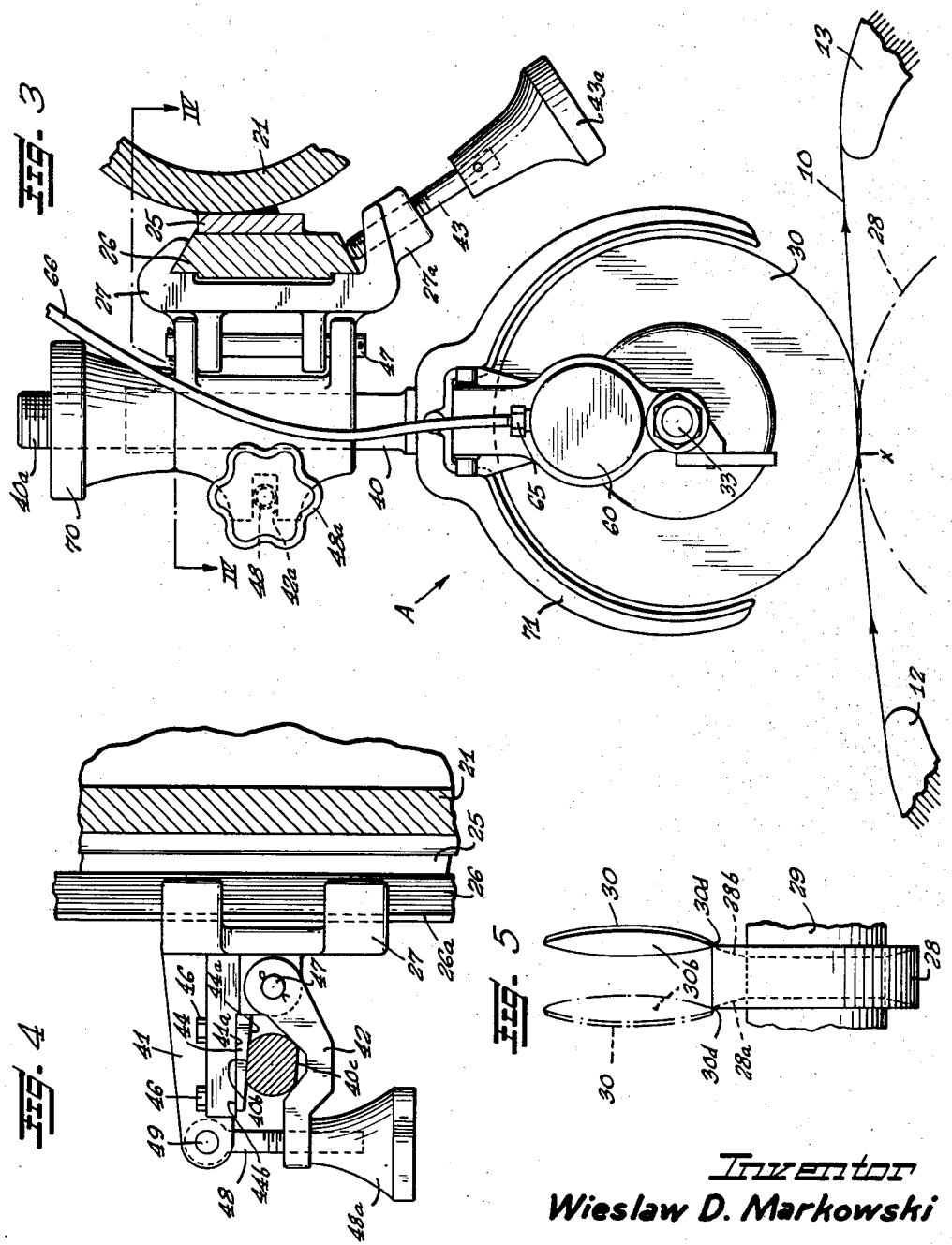
Inventor
Wieslaw D. Markowski

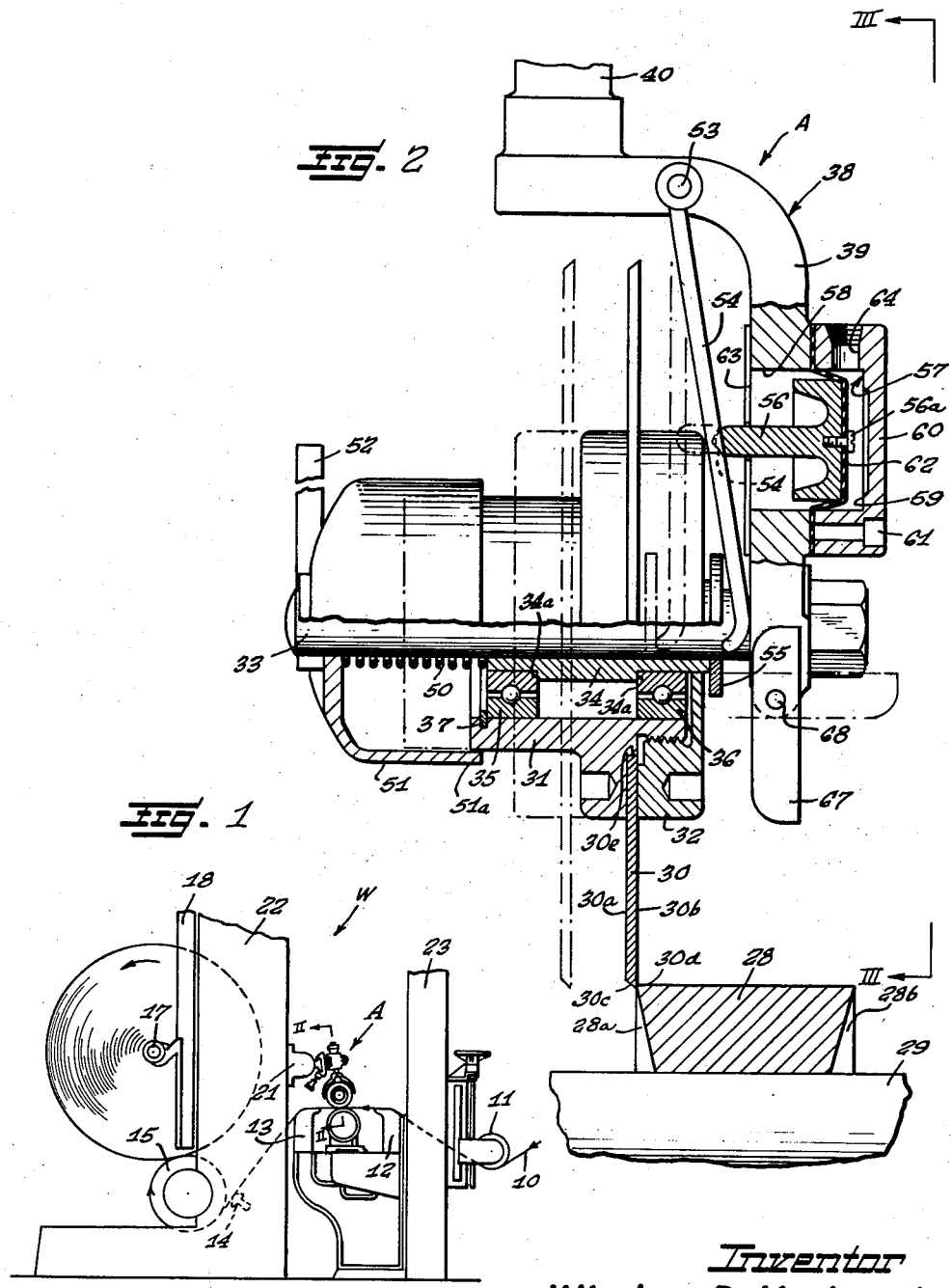

United States Patent Office 3,143,024
Patented Aug. 4, 1964

3,143,024
ROTATABLE CUTTER TOOL PAIR WITH CUTTER DISC ANGULARLY POSITIONED
Wieslaw D. Markowski, Beloit, Wis., assignor, by mesne assignments, to Beloit Eastern Corporation, Downingtown, Pa., a corporation of Delaware
Filed Jan. 26, 1960, Ser. No. 4,811
3 Claims. (Cl. 83—497)

The present invention relates broadly to the art of shearing web materials, and is more particularly concerned with new and improved rotary slitting apparatus featuring in part precise adjustment and maintenance of shear cut angle and point of contact between opposing slitter means.

Slitting apparatus of the kind known as "shear slitters" employed on paper winders and the like generally comprises a pair of vertically opposed shearing surfaces between which the sheet or web is passed and which cut the sheet into desired widths during travel from a parent roll to rewound rolls. The shearing surfaces are customarily referred to in the art as top and bottom slitter bands, and these may take the form of a pair of rotating discs which slightly overlap one another, or the top slitter may be a disc which is lightly held against a power driven wheel or which revolves under spring pressure against the surface of a glass-hard steel cylinder.

Various attempts have been made to maintain a particular shear angle between the top and bottom bands or slitters. Generally, however, the earlier proposals did not permit the slitters to be re-set without disturbing the shear angle, and further, the shear angle adjustment was not finite, so that the shearing or cutting edge soon lost its keenness and a clean cut could not be produced. In addition, there has not been provided by the earlier structures any means which could be considered truly effective for pre-setting and maintaining the point of contact between top and bottom slitter bands. In the past the shear angle and point of contact setting were tasks assigned to the winder operators to be performed by them as required during machine operation; however, in commercial operations the adjustments were often overlooked with resulting rough cuts, or when the tasks were performed, the time required was very lengthy.

It is accordingly an important aim of the present invention to provide novel apparatus for slitting a moving web and which incorporates therein new and improved means for pre-setting and maintaining the shear cut angle and point of contact between opposed slitter surfaces.

Another object of this invention lies in the provision of web shearing apparatus featuring therein means to axially adjust the top slitter with respect to the bottom slitter whereby the nip pressure therebetween can be varied for different grades of paper or other web materials.

Still another object of this invention is to provide a web slitter construction embodying relatively simple and accurately controllable means to adjustably fix the overlap between the shearing surfaces.

A further object of this invention lies in the provision of apparatus for slitting a moving web into a plurality of lesser widths, and which embodies a rotatable cylindrical slitter having a shearing edge, an opposed rotatable conical slitter having a shearing edge, and fluid actuated means controlling the axial position of said conical slitter relative to said cylindrical slitter, to thereby vary the nip pressure therebetween.

A still further object of the instant invention lies in the provision of a method of slitting sheet materials, and which includes as a step thereof rotating opposed cylindrical and conical cutting surfaces having shearing edges thereon in overlapping relation, and advancing the sheet material in contact with the cylindrical surface to sever said sheet material.

An even further object of this invention is to provide shear slitter apparatus featuring therein remote actuation and deactuation of one or more slitters without depending on movement of the precise mounting structure.

Other objects and advantages of the invention will become more apparent during the course of the following description, particularly when taken in connection with the accompanying drawings.

In the drawings, wherein like numerals designate like parts throughout the same:

FIGURE 1 is a fragmentary, more or less diagrammatic end elevational view of an exemplary form of winder machine with which the slitting apparatus of this invention may be employed;

FIGURE 2 is a vertical sectional view taken substantially along the line II—II of FIGURE 1, with certain parts broken away and with other parts in elevation, showing slitting apparatus constructed in accordance with the principles of this invention, and illustrative of axial adjustment featured therein;

FIGURE 3 is an end elevational view of the slitter apparatus, generally taken along the line III—III of FIGURE 2, and showing particularly the mounting therefor and means for effecting penetration;

FIGURE 4 is a horizontal sectional view taken substantially along the line IV—IV of FIGURE 3; and FIGURE 5 is a fragmentary detail view of the slitter apparatus, with parts broken away, to show the relative disposition of the top slitter band relative to the bottom band when operating on either shearing surface of the bottom band.

Referring now to the drawings, there is shown in FIGURE 1 a known form of paper winder designated generally by the legend W and with which slitting apparatus A of this invention may be employed. As is known, a paper web or sheet 10 is directed from a reel spool or parent roll (not shown) under an adjustable lead-in roll 11 to a pair of slitter guard boards 12 and 13 which guide the change of direction of web travel from the lead-in roll 11 to roll 15 and establish a generally horizontal plane for the sheet 10 during movement through the slitting apparatus A. After being slit, the sheet is contacted by an adjustable D-spreader bar 14 functioning to spread the sheet along the slit line, and thereafter the severed or slit sheet wraps a roll 15 and is wound onto a plurality of rewind cores 17 removably mounted by uprights 18. The winder apparatus W of course embodies other structure, which is not essential to an understanding of this invention, and has accordingly been eliminated.

The moving sheet or web 10 is slit or severed into a plurality of desired widths, and in accordance with this invention a plurality of slitting apparatus A are transversely spaced along and supported by the frame of the winder W. The support means may take various forms, and for purposes of illustration in FIGURES 1, 3 and 4, the mounting may be provided by a nonrotating cross beam 21 of generally circular cross section attached to the winder stand 22. To provide the disclosed mounting means for the slitting apparatus A, the beam 21 may have welded or otherwise secured thereto block means 25 attaching with a tapered block member or track 26 engaged by clamp means 27 forming a part of the slitting apparatus A, the specific details of which will be now described.

The rotary shear or slitting apparatus A comprises a first or lower slitter band 28 carried by a rotatable shaft 29, the lower slitter 28 being generally cylindrical and provided at opposite ends with circumferential shearing edges or surfaces 28a and 28b vertically inclined or cut at an angle relative to the axis of the shaft 29. As was stated, a plurality of shearing or slitter bands are spaced transversely of the width of the paper web 10, and the shafts 29 for the lower bands 28 may be individually driven or driven in unison by suitable motor means (not shown). As will be later explained, the provision of shearing surfaces 28a and 28b at opposite ends of the bottom slitter band 28 permits either surface to be utilized merely by reversing the position of the upper slitter band and associated structure. In this way, the slitter assembly A has considerable versatility.

Located for cutting cooperation with the bottom slitter band 28 is a second or top slitter blade 30, preferably taking the form of an essentially flat disc having opposed surfaces 30a and 30b connected by a tapered or conical peripheral surface 30c which provides a shearing edge with the peripheral portion of the surface 30b. The shearing edge thereby provided is identified in the drawings by the numeral 30d. As will be described in greater detail hereinafter, the slitters 28 and 30 are in vertically overlapping contact during the cutting operation, and the lower guard boards 12–13 and the top of the bottom slitter 28 are so positioned relative to one another to slightly elevate the paper web 10 during its run between the blades 28 and 30. Generally speaking, the bottom slitter band 28 is about 1/16 inch above the sheet run level, as established by the guard boards, for relatively lighter sheet weights, and is about 1/8 inch or more higher than the sheet run for weights above eighty pounds per 3000 square feet. By thus elevating the sheet, and by pre-setting and maintaining the point of contact between the slitter bands 28 and 30 and a minimum correct shear angle between said bands, in a manner to be also later described, a clean cut is at all times assured and slitter life is markedly increased.

The top slitter 30 is apertured generally centrally thereof at 30e and is clampingly held between an annular hub member 31 and nut means 32 threadably engaging said hub member. The slitter 30 may be positively driven for rotation by suitable motor means, or may rotate freely for driving action by a driven lower slitter 28. The top slitter 30 is mounted for rotation by shaft means 33 carrying an axially slidable bushing 34 recessed at 34a to mount bearing means 35 and 36 clampingly held in position by the hub member 31. Retaining means 37, which may take the form of a ring, prevents axial movement of the bearing means 35 in the opposite direction.

The support for the top slitter 30 further comprises hanger means 38 which may take the form of a depending arm member 39 connected to a rod member 40 threaded as at 40a (FIGURE 3), and receiving stationary and swingable hinge portions 41 and 42, respectively, of the bracket means 27. As earlier noted, the bracket means 27 attaches by the track 26 and block means 25 to stationary structure, which may be the cross beam 21, as shown in FIGURES 1 and 3. As also appears in FIGURE 3, the clamp means 27 is locked relative to the track means 26 by use of bolt means 43 having a knob portion 43a thereon, the bolt means being threadably received in a tong portion 27a on the bracket means 27.

The instant invention provides as one feature thereof accurate pre-setting within minimum values of the shear angle between the bottom and top slitters 28 and 30, as well as continuously maintaining the pre-set angle during operation of the slitting apparatus A. For this purpose, and as appears in FIGURE 4, the rod 40 is provided with a pair of opposed parallel surfaces 40b and 40c, which are also perpendicular to the axis of the top slitter shaft 33 and accordingly parallel to the surface 30b of the top slitter disc 30. The rod is firmly clamped in the position shown when the top slitter surface 30d is in shearing engagement with the surface 28b on the bottom slitter 28, and as thus clamped it may be noted that adjacent the rod surface 40c said rod is firmly contacted by the inner surfaces of the generally V-shaped movable hinge portion 42. The rod surface 40b, on the other hand, is in flush fitting relation with a tapered surface 44a on a plate member 44 secured to the fixed hinge portion 41 by a plurality of screws on the like 46. The plate member 44 has an opposite surface 44b lying flush against surface 41a on the hinge portion 41, and as is shown in FIGURE 4, the hinge surface 41a is perpendicular to the track surface 26a so that the plate surface 44a is in non-perpendicular relation with said track surface and at an angle thereto depending upon the taper designed into said plate 44.

The shear angle between the slitter surfaces 30d and 28a is thereby determined by the taper in the block or plate 44, and to vary a particular shear angle the block surface 44a is ground to a different angle or shims employed. In any event, however, the shear angle, once established and the parts clamped as in FIGURE 4, remains fixed within precise and carefully controlled limits to assure maximum slitter life. Generally speaking, the shear angle between the slitting surfaces 30d and 28a (or 28b when the upper slitter is reversed for shearing with said surface) can be pre-set or fixed to a relatively narrow range of 1/4° to 2°, and in most instances within 1/2° and 1½°. Of course, the smallest angle of variation is preferred for effective cutting and reduced slitter wear, and to assure obtaining the disclosed novel results, the block 44 is formed of tool steel precisely ground to the desired taper.

The clamping arrangement for the upper slitter rod member 40 may be seen from FIGURE 4 to further include pin means 47 connecting the movable hinge portion 42 to the bracket means 27, and an eye bolt 48 carried by the stationary hinge portion 41 on pin means 49 and received in a slot 42a in the hinge portion 42. The eye bolt 48 may mount knob means 48a to apply the desired tightening action and thereby clamp the parts securely one to the other.

It has been noted that slitting may be accomplished using either of the surfaces 28a or 28b on the lower slitter band 28. This is readily accomplished by releasing the eye bolt 48 from the slot 42a, and with the clamping engagement released, rotating the rod member 40 through an angle of 180° to place the rod surface 40c in flush fitting contact with the plate surface 44a. As is shown in FIGURES 4 and 5, with the rod surface 40b against the block surface 44a the upper shearing surface 30d is in cutting engagement with the lower shearing surface 28b, since the taper of the block 44 is left-handed. Accordingly, to cut with surface 30d against surface 28a, the block 44 must have a right-handed taper which may be provided by reversing said block so that the reduced thickness end is facing inwardly. Thus, to reverse the use of the shearing surfaces 30d and 28a or 28b, the rod 40 is rotated 180° and the taper on the block 44 changed from left to right-handed or vice versa as the case may be. Of course, reversal of the shearing surfaces could be effected by turning the disc 30 on its seat, however, this would require shifting the lower slitter 28, which may not be expedient under all circumstances.

A further feature of the present invention is axial adjustment of the top or conical slitter 30 relative to the bottom or cylindrical slitter 28, producing as one important advantage a variation of the nip pressure between the shearing surfaces 28a or 28b and 30d to accomplish effective cutting on different grades of paper. Referring now again to FIGURE 2, the slidable bushing 34 receives in bottoming contact spring means 50 bottoming at its opposite end against the inner surface of a dust cover 51 fixed against axial movement relative to the shaft means 33 by latch means 52. The dust cover 51 may be seen to have a skirt portion 51a of sufficient length to encircle the hub means 31 in all position of axial adjustment of the top slitter 30.

To provide for the same nip pressure at all shearing edges 30d, and sufficient clearance between the top and bottom surfaces 30d and 28a or 28b to permit threading without sheet tearing, the following structure is provided. The depending arm portion 39 of the hanger means 38 pivotally carries at 53 a lever arm 54 carried by the pin means or pivot point 53 in a manner to be in continuous tensioned contact with washer means 55 axially slidable upon the shaft means 33. Swingable movement of the lever arm 54 to axially move the slitter 30 from full line to phantom line position is accomplished by actuation of a piston member 56 housed in a chamber 57 formed by a passage 58 in the arm portion 39 and a recess 59 in a cap member 60. The cap member 60 is secured to the arm portion 39 as at 61, and clampingly held by said cap member and arm portion is a flexible diaphragm 62, which may be attached to the piston 56 by screw means 56a. The piston 56 is slidable within an apertured plate member 63 attached to the hanger arm portion 39, and piston movement is accomplished by admission of pressurized fluid through an inlet port 64 in the cap member 60, the inlet port 64 receiving a connection 65 (FIGURE 3) connecting 54 with a hose line or the like 66. If desired, the lever arm 54 may be recessed as at 54a to receive the piston end portion.

The depending arm portion 39 of the hanger means 38 further mounts a setting or stop lever 67 swingably mounted upon pin means or the like 68. The lever 67 is employed to ensure correct slitter setting. If air pressure is used to disengage the slitters 28 and 30, as in FIGURE 3, the setting lever 67 is rotated counter-clockwise on the pin means 68, which moves the top slitter assembly to the left, generally of the order of ⅛ inch. The top slitter assembly can then be moved along the track 26, after the clamping bolt 43 has been released, until the surfaces 30d and 28a are in contact. Thereupon the bolt 43 is locked in position and the lever 67 turned clockwise. Now, when air pressure is applied to the chamber 57, piston movement and swinging action of the arm 54 cause leftward movement of the top slitter assembly to generally the phantom line position shown in FIGURE 2. Under normal circumstances, this will be about ¾ inch from the full line or operating position to facilitate sheet threading. In this manner, by proceeding as described, the same nip pressure at all shearing edges 30d is ensured by operation of the setting lever 67, and as well, sufficient clearance is provided when the slitters 28 and 30 are disengaged so that when the web is passed in its entirety through the apparatus A, web tearing is prevented.

On the other hand, when the shearing edge 30d is operable against the shearing surface 28b, by rotation of the rod member 40 and other action earlier noted with reference to the block 44, the setting lever operates in the following manner. When the shearing edge 30d is used for slitting with the surface 28b, air pressure is employed to regulate the nip pressure of the shearing edge 30d and to engage the slitters 28 and 30. The lever 67 under these conditions is moved clockwise, which moves the top slitter assembly to the left, and of course under these circumstances the top slitter 30 is reversed as earlier described. With the parts in the position now noted, surface 30b is brought into contact with the lower slitting surface 28b and the bolt 43 locked. If the lever 67 is then turned counterclockwise to a rest position, the top slitter blade 30 moves to the right, to its rest position, under action of the spring means 50, and to a position about ¾ inch from the surface 28b. In this manner, as was noted in the preceding paragraph, sufficient clearance is provided so that tearing does not result when the web is passed through the slitter apparatus A.

Experience has further indicated that in order to obtain a clean cut, the sheet or web 10 should be cut at an exactly vertical point from the center point at the bottom band 28. This is illustrated best in FIGURE 3, wherein it may be seen that the top and bottom slitters not only overlap, but contact at a point identified in FIGURE 3 by the legend "x." It should be mentioned in this connection that the threaded rod or shaft 40 moves vertically along a line connecting the centers of the slitter bands 28 and 30; however, in FIGURE 3 the line of travel of the web 10 is shown as canted from a true horizontal, which illustrates the same effect as if the top slitter was shown as off a true vertical plane. In any event, the front surface of the block or track 26 is tapered or inclined, or the block 26 welded at an angle to the crossbeam, so that the rod 40 moves vertically along a line connecting the centers of the bands 28 and 30. In this manner, the point "x" remains the same even though the diameter of the top slitter decreases due to sharpening.

It is important to emphasize that for effective shearing action and a clean cut the slitter bands 28 and 30 should contact at the point "x" in FIGURE 3, which is in the plane of the sheet whereat the sheet is firmly supported, and lying on a true vertical centerline passing through the radial center of the bottom slitter 28. Now, as is appreciated, the web 10 wraps the bottom slitter 28 in advance of the point "x" at the oncoming side of the nip, the length of the wrap depending in fact upon the speed of web travel and the sheet weight. Thus, at relatively high sheet speeds and relatively light weight web materials, as for example tissue, there is lesser web tension and air entering the oncoming side of the nip lifts the sheet and decreases the amount of wrap. However, when point "x" is properly located so that the slitters 28 and 30 contact at this point, which is the point at which the web exerts maximum pressure on the band 28, a clean cut is still obtained, even though the wrap may be even one-half that at average speeds with average weight papers.

There may of course be circumstances, such as machining tolerances and possible errors in penetration adjustments, under which the point of contact "x" between the slitters 28 and 30 may move slightly in the direction of the oncoming side of the nip. Generally stated, the point of contact can move to the end of the lead-in wrap at high speeds, and yet satisfactory slitting still be obtained, as long as the point of contact does not move farther therebeyond.

While not specifically noted hereinabove, in accordance with customary practice the top slitter blade is provided with a guard, identified in FIGURE 3 by the numeral 71, and omitted from the showing of FIGURE 2 for purposes of clarity. The guard means 71 may conveniently be carried by the rod member 40 and removably mounted thereon as desired for ease of access to the top blade 30.

It may be seen that by this invention a correct shear angle is at all times maintained between the top and bottom bands, and as well, the paper sheet or web is cut at an exactly vertical point from the centerpoint at the bottom band. The correct point of contact between the top and bottom slitters is accurately pre-set and maintained even though the diameter of the top band is reduced by resharpening. Shimming of the top slitter assembly is not required. By obtaining and maintaining a correct shear angle in a minimum range a clean cut is at all times assured, and slitter life substantially extended. In fact, by the instant invention, sharpening of the top slitter band is reduced from the order of every 8 or 10 hours to only about once every three weeks. As will also now be apparent, the slitting apparatus A is essentially vibration free. The top slitter is fixedly mounted upon stationary structure 21, which is quite by contrast to horizontally movable pipe supports employed to effect engagement and disengagement of intermediate slitters. By reason of this horizontal movement, the pipe support had slight clearances and was thereby vibration-prone, particularly on high speed winders. And as has been described, by provision of individual pistons 56 and chamber 57, the top slitters 30 are all independently controllable, and any number of said slitters may be employed, either individually or simultaneously. This arrangement is particularly advantageous when the sheet edge is torn off, or other circumstances arise. Further, and as was described, by provision of axial movement for the top slitters 30, a predetermined nip pressure is provided, and this is particularly valuable in view of the many grades of paper requiring slitting or cutting.

It has been noted that the means for axially moving the top slitters 30 may take the form of resilient means to disengage the top slitters from the bottom slitters, and fluid actuated means to return the top slitters to a position of engagement with the bottom slitters. This modification, and others readily apparent to those versed in the art, may be practiced without departing from the novel concepts of the instant invention.

I claim as my invention:

1. An apparatus for slitting a traveling web comprising,
   a knife edged first cutter rotatably mounted on a first axis,
   a second cutter having axially spaced first and second cutting edges and rotatably mounted on a second axis,
   a shaft-like support member extending transverse to said first axis supporting said first cutter and having opposed flat parallel side clamping surfaces and rotatable about its axis 180° between first and second positions with said first cutter coacting with said first edge in said first position and with said second edge in said second position, a mounting member having a fixed mounting surface,
   a tapered block member having side surfaces at a predetermined angle relative to each other with an inner side surface engaging the mounting surface and an outer side surface engaging said clamping surface,
   said block member being reversible so that the angle of the outer side surface is changed relative to the mounting surface and to change the angle of the first cutter relative to the second cutter,
   and means for fixedly clamping said support member against said block member and said block member against said support surface.

2. An apparatus slitting a traveling web in accordance with claim 1 wherein said clamping means includes a swingable hing portion engaging said support member and a swing bolt and threaded knob on the bolt arranged to lock said hinge portion against the support member.

3. An apparatus for slitting a traveling web in accordance with claim 1 wherein said mounting member is positioned on a slide substantially parallel to said first and second axes for changing the position of the mounting member.

References Cited in the file of this patent

UNITED STATES PATENTS

| Re. 6,315 | Eachus | Mar. 2, 1875 |
| 10,889 | Gavitt | May 9, 1854 |
| 164,920 | Judson | June 29, 1875 |
| 391,750 | Koegel | Oct. 23, 1888 |
| 453,655 | McCorkindale | June 9, 1891 |
| 559,179 | Koegel | Apr. 28, 1896 |
| 577,985 | Koegel | Mar. 2, 1897 |
| 802,572 | King | Oct. 24, 1905 |
| 1,134,590 | Cowan | Apr. 6, 1915 |
| 1,355,104 | Cameron | Oct. 5, 1920 |
| 1,482,437 | Koegel | Feb. 5, 1924 |
| 1,754,969 | Spoor | Apr. 15, 1930 |
| 2,043,818 | Thibedeau | June 9, 1936 |
| 2,571,201 | Clem | Oct. 16, 1951 |

FOREIGN PATENTS

| 88,518 | Germany | Sept. 15, 1896 |